United States Patent
Miller et al.

(10) Patent No.: US 8,569,213 B2
(45) Date of Patent: Oct. 29, 2013

(54) DRILLING FLUIDS HAVING REDUCED SAG POTENTIAL AND RELATED METHODS

(71) Applicants: Jeffrey James Miller, Houston, TX (US); Nicholas Braley, Houston, TX (US); Donald R. Siems, Houston, TX (US); Dale E. Jamison, Houston, TX (US); Patrick Baker, Houston, TX (US)

(72) Inventors: Jeffrey James Miller, Houston, TX (US); Nicholas Braley, Houston, TX (US); Donald R. Siems, Houston, TX (US); Dale E. Jamison, Houston, TX (US); Patrick Baker, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/741,687

(22) Filed: Jan. 15, 2013

(65) Prior Publication Data
US 2013/0130945 A1    May 23, 2013

Related U.S. Application Data

(62) Division of application No. 12/977,425, filed on Dec. 23, 2010, now Pat. No. 8,476,201.

(51) Int. Cl.
*C09K 8/36* (2006.01)

(52) U.S. Cl.
USPC .................. 507/140; 507/143; 175/65

(58) Field of Classification Search
None
See application file for complete search history.

(56) References Cited

U.S. PATENT DOCUMENTS

| | | | | |
|---|---|---|---|---|
| 4,428,843 | A | * | 1/1984 | Cowan et al. ............... 507/106 |
| 4,531,594 | A | * | 7/1985 | Cowan ......................... 175/72 |
| 4,579,668 | A | * | 4/1986 | Messenger ................. 507/118 |
| 5,314,022 | A | * | 5/1994 | Cowan et al. ............... 166/293 |
| 2009/0258799 | A1 | | 10/2009 | Hodder et al. |

FOREIGN PATENT DOCUMENTS

| | | |
|---|---|---|
| WO | WO2008033838 A2 | 3/2008 |
| WO | WO2008033838 A3 | 3/2008 |

OTHER PUBLICATIONS

International Search Report and Written Opinion for PCT/GB2011/001769 dated Feb. 28, 2013.
International Preliminary Report on Patentability for PCT/GB2011/001769 dated Jul. 4, 2013.

* cited by examiner

*Primary Examiner* — John J Figueroa
(74) *Attorney, Agent, or Firm* — Craig W. Roddy; McDermott Will & Emery LLP

(57) ABSTRACT

Invert emulsion drilling fluids that have extended emulsion stability and reduced sag potential can be realized through incorporation of colloidal particles therein. The invert emulsion drilling fluids can be free of organophilic clays. The organophilic clay-free drilling fluids can comprise: an oleaginous fluid continuous phase; an aqueous fluid internal phase; a surfactant; a weighting agent; and a plurality of colloidal particles, the colloidal particles comprising fibrous colloidal particles and at least one other type of colloidal particle; wherein at least a portion of the plurality of colloidal particles interact with the surfactant to form an associative supporting structure that inhibits sag of the weighting agent.

13 Claims, 4 Drawing Sheets

DRILLING FLUIDS HAVING REDUCED SAG POTENTIAL AND RELATED METHODS

CROSS-REFERENCE TO RELATED APPLICATIONS

This application is a divisional application of U.S. patent application Ser. No. 12/977,425, filed on Dec. 23, 2010 and now published as U.S. Patent Application Publication 2012/0165231, which is incorporated herein by reference in its entirety.

BACKGROUND

The present invention relates to invert emulsion drilling fluids for use in subterranean applications, and, in particular, invert emulsion drilling fluids having extended emulsion stability and reduced barite sag potential.

A drilling fluid or drilling mud is a designed fluid that is circulated through a wellbore to facilitate a drilling operation. Functions of a drilling fluid can include, without limitation, removing drill cuttings from the wellbore, cooling and lubricating the drill bit, aiding in the support of the drill pipe and the drill bit, and providing a hydrostatic head to maintain integrity of the wellbore walls and preventing blowouts from occurring.

It is often desirable to change the density of a drilling fluid to maintain pressure balance within a wellbore and keep the wellbore stable. Changing the density is usually accomplished by adding a weighting agent to the drilling fluid. Often, the weighting agent is barite (barium sulfate), sometimes spelled baryte. Barite is an insoluble material, and additional stabilizers are usually added to the drilling fluid to maintain the salt in a suspended state. Stabilizers can include, for example, thickeners, viscosifying agents, gelling agents and the like. Use of stabilizers can be problematic if they increase the viscosity of the drilling fluid so much that effective pumping into the wellbore becomes difficult.

In lower viscosity drilling fluids, even in the presence of added stabilizers, barite can begin to settle from the drilling fluid in a condition known as "barite sag." Other solid weighting agents can also experience sag. As used herein, the term "barite sag" refers to a slow settling of barite or other solid weighting agent in a drilling fluid. Barite sag is undesirable because it can lead to an uneven fluid density in the wellbore and altered well performance. Barite sag can be particularly problematic in cases where the drilling fluid cannot be effectively sheared before being pumped downhole. For example, barite sag can occur during transport of a drilling fluid to an offshore drilling platform. In other instances, barite sag can occur downhole when the drilling fluid spends a longer than usual time downhole or there are inadequate downhole shearing forces. In extreme cases, barite sag can deposit a bed of barite on the low side of the wellbore, eventually leading to stuck pipe and possible abandonment of the wellbore.

The difference in a drilling fluid's surface density at the well head and the density while pumping or circulating downhole is typically referred to as the equivalent circulating density (ECD). Several drilling fluids having low ECDs have been developed that contain organophilic clay or organolignite additives. As used herein, the term "organophilic clay" refers to clays that have been treated with a cationic surfactant (e.g., a dialkylamine cationic surfactant or a quaternary ammonium compound) or like surface treatments. Organolignite additives have been prepared in a like manner. Organophilic clays swell in non-polar organic solvents, thereby forming open aggregates that are believed to be a suspending structure for barite and other solid weighting agents in invert emulsion drilling fluids containing these agents. Although such additives are effective at mediating barite sag in many cases, exposure of organophilic clays, in particular, to drill cuttings can alter the performance of the drilling fluid. In particular, organophilic clays prevent the formation of ideal or near ideal thixotropic fluids that are initially viscous but then thin at a later time.

Drilling fluids not containing organophilic clays or organolignite additives can have emulsion structures that are sensitive to low concentrations of solids therein. In these cases, a minimum concentration of solids can be required to achieve adequate emulsion stability over time. Many drilling applications rely upon the downhole introduction of solids into the drilling fluid in the form of drill cuttings in order to stabilize the drilling fluid's emulsion structure. In these cases, the introduction of ~2-3% drill cutting solids is typically considered necessary to maintain downhole emulsion stability. Although downhole introduction of drill cutting solids provides satisfactory performance in many cases, there are notable exceptions when this is not the case. In some instances, drilling operations may not incorporate sufficient amounts of drill cutting solids into the drilling fluid to achieve satisfactory emulsion stability. In other instances, the drill cutting solids may not be of the correct type to achieve satisfactory emulsion stability. For example, sand formations and salt formations can provide drill cutting solids that fail to satisfactorily stabilize the drilling fluid's emulsion structure. In still other instances, the drilling fluid may experience significant sag during delivery to a drilling site.

SUMMARY

The present invention relates to invert emulsion drilling fluids for use in subterranean applications, and, in particular, invert emulsion drilling fluids having extended emulsion stability and reduced barite sag potential.

In one embodiment, the present invention provides a method comprising: providing a drilling fluid that comprises: an invert emulsion, the invert emulsion comprising an oleaginous fluid continuous phase, an aqueous fluid internal phase, and a surfactant; a weighting agent; and a plurality of colloidal particles; wherein at least a portion of the plurality of colloidal particles interact with the surfactant to form an associative supporting structure that inhibits sag of the weighting agent; and placing the drilling fluid in a subterranean formation via a wellbore penetrating the subterranean formation.

In one embodiment, the present invention provides a method comprising: providing a drilling fluid that is free of organophilic clays and comprises: an invert emulsion, the invert emulsion comprising an oleaginous fluid continuous phase, an aqueous fluid internal phase, and a surfactant; barite particles having a size of at most about 45 microns; and a plurality of colloidal particles; wherein the drilling fluid has a density that changes by less than about 5% over at least about 62 hours of static aging; and drilling a wellbore in a subterranean formation using the drilling fluid.

In one embodiment, the present invention provides a method comprising: providing a drilling fluid that is free of organophilic clays and comprises: an invert emulsion, the invert emulsion comprising an oleaginous fluid continuous phase, an aqueous fluid internal phase, and a surfactant; barite particles having a size of at most about 45 microns; and a plurality of colloidal particles; wherein at least a portion of the plurality of the colloidal particles interact with the surfactant to form an associative supporting structure that inhibits sag of the barite particles; and drilling a wellbore in a subterranean formation using the drilling fluid.

In one embodiment, the present invention provides an organophilic clay-free drilling fluid comprising: an oleaginous fluid continuous phase; an aqueous fluid internal phase; a surfactant; barite particles; and a plurality of colloidal particles; wherein the drilling fluid has a density that changes by less than about 5% over at least about 62 hours of static aging.

In one embodiment, the present invention provides an organophilic clay-free drilling fluid comprising: an oleaginous fluid continuous phase; an aqueous fluid internal phase; a surfactant; a weighting agent; and a plurality of colloidal particles; wherein at least a portion of the plurality of colloidal particles interact with the surfactant to form an associative supporting structure that inhibits sag of the weighting agent.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

FIG. 2 shows the complete rheology profile from 600 rpm to 0.9 rpm, and FIG. 3 shows an expansion of the low shear region of FIG. 2 from 0.9 rpm to 10 rpm.

DETAILED DESCRIPTION

Figure 1:
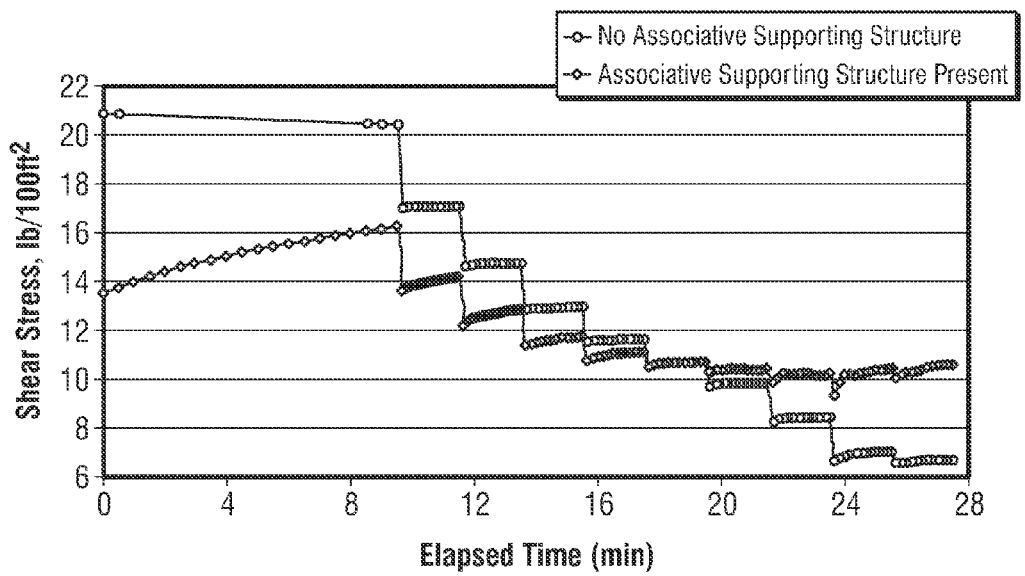
FIG. 1 shows a step-down vane rheology plot for illustrative drilling fluids of the present invention compared to those not containing an associative supporting structure.

The present invention relates to invert emulsion drilling fluids for use in subterranean applications, and, in particular, invert emulsion drilling fluids having extended emulsion stability and reduced barite sag potential. More specifically, the present invention provides invert emulsion drilling fluids that have good rheological properties and maintain low ECDs over extended periods of time.

Although the description that follows is primarily directed to drilling fluids containing barite particles, drilling fluids containing like weighting agents can also be stabilized by making use of the present embodiments.

Of the many advantages of the present invention, only a few of which are discussed or alluded to herein, the present invention generally provides facile methods for drilling wellbores in certain subterranean formations. This is accomplished using invert emulsion drilling fluids that have a reduced potential for barite sag and increased emulsion stability over extended periods of time. Emulsion stability can be reflected in the drilling fluid having a relatively stable density and rheological profile over extended aging times. The invert emulsion drilling fluids of the present invention utilize colloidal particles or combinations of colloidal particles that confer extended density stability to the drilling fluid, particularly at downhole temperatures. Density stabilization by the colloidal particles makes the present drilling fluids desirable for extended downhole use, especially in highly deviated wellbores, wellbores having narrow annuli, and wellbores in depleted formations, where the drilling fluids can spend a considerable amount of time downhole. In addition, density stabilization by the colloidal particles can allow the present drilling fluids to be transported to a drilling site without fear of density gradients forming in the drilling fluid during transport.

According to conventional thinking, the addition of colloidal particles to a drilling fluid would result in an undesirable increase in viscosity. However, as described hereinafter, the addition of colloidal particles to a drilling fluid surprisingly improves the drilling fluid's low shear rheological profile. Further, Applicants have discovered certain instances in which the colloidal particles interact with the surfactant of the invert emulsion to form an associative supporting structure that helps stabilize the emulsion structure.

The drilling fluids of the present invention advantageously utilize the introduction of colloidal particles within the drilling fluid before pumping downhole to stabilize the drilling fluid's emulsion structure and the distribution of the weighting agent therein. According to the present embodiments, the introduction of drill cutting solids during a drilling operation and extensive downhole shearing are not necessarily required to stabilize the emulsion while downhole. The earlier introduction of colloidal particles allows the composition of the drilling fluid to be maintained in a desired range for conferring emulsion stability, while producing a desired rheological performance over extended periods of time. In addition, the earlier introduction of colloidal particles allows the drilling fluid to be pumped downhole without applying shear prior to or during the pumping operation in order to redisperse the weighting agent. Accordingly, the drilling fluid can be formulated at a production facility, sheared and then transported to a drilling site for downhole pumping.

An additional advantage of the present drilling fluids is that the colloidal particles are present in an amount that is sufficient to confer extended density stability to the drilling fluid without degrading its rheological performance compared to a drilling fluid not containing at least some of the colloidal particles. Thus, the present drilling fluids remain very amenable to downhole pumping and demonstrate desirable downhole performance characteristics. In addition, the incorporation of colloidal particles into the present drilling fluids can result in certain beneficial rheological enhancements, as discussed herein.

It has been conventional in the art to simulate downhole performance of a drilling fluid through static aging of a drilling fluid sample under conditions comparable to those experienced downhole. By monitoring the drilling fluid sample's rheological performance and density as a function of time under simulated downhole conditions, an indicator of downhole performance and sag potential can be ascertained. Typically, it has been conventional to conduct these measurements after 16 hours of static aging. This period of time has been considered by those of ordinary skill in the art to be sufficiently indicative of the long term density stability and rheological performance of the drilling fluid while downhole. However, Applicants have discovered that some drilling fluids that exhibit acceptable performance at 16 hours of aging have a completely changed density and rheological profile at more extended aging times (e.g., about 62 hours). Therefore, a drilling fluid that might seem suitable for downhole use based on the 16-hour aging data might, in fact, be completely unacceptable for extended downhole residence times. Drilling fluids of the present invention containing colloidal particles advantageously provide relatively stable densities and good rheological performance over extended periods of time, which make them more suitable for certain downhole operations. In particular, the low shear rheological performance of the present drilling fluids is particularly distinguishable over that of conventional drilling fluids.

As noted above, the addition of colloidal particles to the drilling fluids of the present invention is believed to beneficially stabilize the drilling fluid's emulsion structure and density over extended periods of time. Without being bound by theory or mechanism, Applicants believe that at least a portion of the plurality of colloidal particles interact with the surfactant of the invert emulsion to form an associative supporting structure that inhibits sag of barite particles or a like weighting agent over extended periods of time. As used herein, the term "associative supporting structure" refers to, for example, a covalent or non-covalent interaction between at least some of the colloidal particles and the surfactant in an invert emulsion drilling fluid that provides a more enhanced support for barite particles or like weighting agent than is possible with either component alone. Stated another way, there is an observed synergistic stabilizing effect between at least a portion of the colloidal particles and the surfactant of the invert emulsion drilling fluids. This synergistic stabilizing effect can be observed by examining the rheological profile of a drilling fluid without at least one of the synergistic components (i.e., the colloidal particles and/or the surfactant) and comparing the observed profile to that of a drilling fluid with the synergistic components. Although such associative supporting structures can have long-range structural features, the use of this term does not necessarily convey any form of long-range structure. By way of non-limiting example, it is believed that colloidal particles of sufficiently small size may interact with surfactant-stabilized micelles to modify the micelles' interaction with an oleaginous continuous phase by adding bulk to the micelle-continuous phase interface. Again without being bound by theory or mechanism, Applicants believe that such an interaction may be responsible for creating a structure that results in stabilization of the emulsion interface in the drilling fluids of the present invention.

To determine if an associative supporting structure exists in a drilling fluid, sag testing and rheological performance testing may be performed as described in the Experimental Examples herein. In general, Applicants believe that an associative supporting structure exists if the density of the drilling fluid decreases by less than about ±5% over at least about 62 hours of static aging and/or if the low shear rheological profile of the drilling fluid changes by less than about ±25%, as measured by the dial reading at a rotation rate of 6 rpm or less on a Fann Model 35 Viscometer. Further, Applicants believe that an associative supporting structure exists if the drilling fluid exhibits a significantly different step-down vane rheology profile compared to that of a drilling fluid not containing an associative supporting structure. For example, FIG. 1 shows a step-down vane rheology plot for illustrative drilling fluids of the present invention compared to those not containing an associative supporting structure. Several drilling fluids having these qualities are presented in the Experimental Examples herein.

The present invention describes methods using invert emulsion drilling fluids. In some embodiments, the methods comprise providing a drilling fluid comprising an invert emulsion, a weighting agent, and a plurality of colloidal particles, and placing the drilling fluid in a subterranean formation via a wellbore penetrating the subterranean formation. The invert emulsion comprises an oleaginous fluid continuous phase, an aqueous fluid internal phase, and a surfactant. At least a portion of the plurality of colloidal particles interact with the surfactant to form an associative supporting structure that inhibits sag of the weighting agent.

In some embodiments, the weighting agent comprises barite particles. In some embodiments, the barite particles have a size of at most about 45 microns. In some embodiments, the barite particles have an average size ($d_{50}$) of 45 microns or less.

Weighting agents other than barite can be used in any of the embodiments described herein. In some embodiments, weighting agents such as, for example, hematite, magnetite, iron oxides, illmenite, siderite, celestite, dolomite, olivine, calcite, magnesium oxides, halites and the like can be used. In some embodiments, weighting agents such as calcium carbonate, strontium sulfate, or manganese tetraoxide can be used. In still other embodiments, the weight agent "MICROMAX" can be used. "MICROMAX" is a manganese tetraoxide-based weighting agent that is available from Elkem Materials. Other weighting agents can also be envisioned by those of ordinary skill in the art.

In some embodiments, the drilling fluid has a density that changes by less than about 5% over at least about 62 hours of static aging. In some embodiments, the drilling fluid has a density that changes by less than about 4.5% over at least about 62 hours of static aging. In still other embodiments, the drilling fluid has a density that changes by less than about 4% over at least about 62 hours of static aging. In some embodiments, the drilling fluid has a density that changes by less than about 3% over at least about 62 hours of static aging. In still other embodiments, the drilling fluid has a density that changes by an amount between about 1% to about 4% over at least about 62 hours of static aging.

In some embodiments, the acceptable density change of the drilling fluid varies in proportion to the weight of the drilling fluid. For example, for a 14 lb/gal drilling fluid, the change in density can be less than about 5% over at least about 62 hours of static aging. However, for heavier drilling fluids, the change in density can preferably be less over the static aging period. For example, for a 16 lb/gal drilling fluid, the change in density can be less than about 4.5% over at least about 62 hours of static aging, and for a 18 lb/gal, the change in density can be less than about 4% over at least about 62 hours of static aging. In the heavier drilling fluids, these density change values provide the same 0.7 lb/gal variance that occurs for a 14 lb/gal drilling fluid when a 5% change in density occurs.

In some embodiments, the drilling fluids are free of organophilic clays. In some embodiments, the drilling fluids are substantially free of lignite.

In various embodiments, the drilling fluids of the present invention are substantially free of organophilic clays and/or organophilic lignite. In some embodiments, the organophilic clay-free drilling fluids comprise an oleaginous fluid continuous phase, an aqueous fluid internal phase, a surfactant, barite particles or a like weighting agent, and a plurality of colloidal particles. The drilling fluid has a density that changes by less than about 5% over at least about 62 hours of static aging. In some embodiments, at least a portion of the plurality of colloidal particles interact with the surfactant to form an associative supporting structure that inhibits sag of the barite particles for at least about 62 hours. Inhibition of barite sag can be measured by the drilling fluid having a change in density of less than about 5% over this time.

As used herein, the term "invert emulsion" refers to an emulsion comprising an oleaginous fluid continuous phase and an aqueous fluid internal phase. Such emulsions are commonly referred to as oil-in-water emulsions in which an oil or like non-polar hydrophobic compound forms the continuous phase and water or a water-miscible but oleaginous fluid immiscible compound forms the internal phase.

As used herein, the term "oleaginous fluid" refers to a material having the properties of an oil or like non-polar hydrophobic compound. Illustrative oleaginous fluids suitable for use in the present invention include, for example, (i) esters prepared from fatty acids and alcohols, or esters prepared from olefins and fatty acids or alcohols; (ii) linear alpha olefins, isomerized olefins having a straight chain, olefins having a branched structure, isomerized olefins having a cyclic structure, and olefin hydrocarbons; (iii) linear paraffins, branched paraffins, poly-branched paraffins, cyclic paraffins and isoparaffins; (iv) mineral oil hydrocarbons; (v) glyceride triesters including, for example, rapeseed oil, olive oil, canola oil, castor oil, coconut oil, corn oil, cottonseed oil, lard oil, linseed oil, neatafoot oil, palm oil, peanut oil, perilla oil, rice bran oil, safflower oil, sardine oil, sesame oil, soybean oil and sunflower oil; (vi) naphthenic compounds (cyclic paraffin compounds having a formula of $C_nH_{2n}$, where n is an integer ranging between about 5 and about 30); (vii) diesel; (viii) aliphatic ethers prepared from long chain alcohols; and (ix) aliphatic acetals, dialkylcarbonates, and mixtures thereof. As used herein, fatty acids and alcohols or long chain acids and alcohols refer to acids and alcohols containing about 6 to about 22 carbon atoms, or about 6 to about 18 carbon atoms, or about 6 to about 14 carbon atoms. In some embodiments, such fatty acids and alcohols have about 6 to about 22 carbon atoms comprising their main chain. One of ordinary skill in the art will recognize that the fatty acids and alcohols may also contain unsaturated linkages.

In general, oleaginous fluid continuous phases having low initial viscosities prior to the addition of colloidal particles produce drilling fluids having the best ECDs. Commercially available invert emulsion drilling fluids containing such oleaginous fluid continuous phases include, for example, "PETROFREE SF", "ACCOLADE" and "ENCORE," each of which is available from Halliburton Energy Services. Of these, "ENCORE" has the lowest initial viscosity. Other invert emulsion drilling fluids include "XP-07" available from Halliburton Energy Services, "ESCAID 110" available from ExxonMobil Corporation, "HDF-2000" available from TOTAL-Fina, and "PUREDRILL IA-35" available from Petro-Canada. Of these, "XP-07" and "ESCAID 110" have low initial viscosities and may be particularly suitable for producing a low ECD drilling fluid. Although the particularly low viscosity of "XP-07" is especially appealing for producing a drilling fluid having a low ECD, this base oil has not been approved for Gulf of Mexico operations. "ENCORE" and "ACCOLADE," in contrast, have both been approved for Gulf of Mexico use. In various embodiments, the base oil of the drilling fluids can be used after it has been recycled or recovered from other sources. Optionally, the base oil can have other components added to it during formulation of the present drilling fluids. In other embodiments, other components can already be included in the commercially available drilling fluid.

As used herein, the term "aqueous fluid" refers to a material comprising water or a water-miscible but oleaginous fluid-immiscible compound. Illustrative aqueous fluids suitable for practicing the present invention include, for example, fresh water, sea water, a brine containing at least one dissolved organic or inorganic salt, a liquid containing water-miscible organic compounds, and the like. In some embodiments, an aqueous fluid can contain a mixture of water and a glycol.

In the present drilling fluids, the oleaginous fluid continuous phase and the aqueous fluid continuous phase are present in a ratio of at least about 70:30. This ratio is commonly stated as the oil-to-water ratio (OWR). That is, in the present embodiments, a drilling fluid having a 70:30 OWR comprises 70% oleaginous fluid continuous phase and 30% aqueous fluid internal phase. In some embodiments, the present drilling fluids have an OWR ranging between about 70:30 to about 80:20, including all subranges therebetween. In some embodiments, the drilling fluids have an OWR ranging between about 74:26 and about 80:20, including all subranges therebetween. In some embodiments, the drilling fluids have an OWR of about 75:25 or greater. In some embodiments, the drilling fluids have an OWR of about 80:20 or greater. In some embodiments, the drilling fluids have an OWR of about 85:15 or greater. In some embodiments, the drilling fluids have an OWR between about 90:10 and 60:40, including all subranges therebetween. One of ordinary skill in the art will recognize that lower OWRs can more readily form emulsions that are suitable for suspending barite and other weighting agents therein. However, one of ordinary skill in the art will also recognize that an OWR that is too low may prove overly viscous for downhole pumping.

In general, the surfactants of the present invention are not particularly limited and need only be capable of stabilizing aqueous fluid micelles in an invert emulsion. In addition, the surfactant can interact with colloidal particles in the invert emulsion drilling fluid to form an associative supporting structure. Illustrative surfactants suitable for use in the present invention include, for example, acid hydrolyzable mixed alkyldiethanol amides, alkyl glucosides, polyalkylglucosides, alkylalkoxypolydimethylsiloxanes, polyalkyldimethylsiloxanes, fatty acids, soaps of fatty acids, amido amines, polyamides, polyamines, oleate esters, imidazoline derivatives, oxidized crude tall oil, organic phosphate esters, alkyl aromatic sulfates, alkyl aromatic sulfonates, alkyl sulfates, alkyl sulfonates, monoesters of polyalkoxylated sorbitan, polyester polyols, aliphatic alcohol esters, aromatic alcohol esters, ammonium salts of polyacrylic acid, and ammonium salts of 2-acrylamido-2-methylpropane sulfonic acid/acrylic acid copolymer. In some embodiments, the surfactant is a polyamide. In other embodiments, the surfactant is a fatty acid. Illustrative commercial surfactants suitable for practicing the present invention include, for example, "ALADOL 511" (a tall oil fatty acid diethanolamide available from Akzo Nobel Surface Chemistry of Chicago, Ill.), "TWEEN 81" (a polyoxyethylene(5)sorbitan monooleate available from Uniqema of New Castle, Del.), "ALKAM-ULS SMO" (a sorbitan monooleate available from Rhone Poulenc Inc. of Paris, France) and "INVERMUL," "EZ MUL," "EZ MUL NT," "EZ MUL NS," "LE SUPERMUL" and "LE MUL" (all available from Halliburton Energy Services of Houston, Tex.).

Generally, such surfactants are present in an amount that does not interfere with the use of the invert emulsions as drilling fluids and further facilitates the development of enhanced density stability and rheological properties as described herein. In some embodiments, the surfactants are present in the invert emulsion drilling fluids in an amount less than about 10% by volume of the drilling fluid. In other embodiments, the surfactants are present in the invert emulsion drilling fluids in an amount less than about 3% by volume of the drilling fluid.

In the present embodiments, the barite particles or like weighting agent and the plurality of colloidal particles are added to the drilling fluid to produce a desired density in the drilling fluid. As used herein, the combination of barite particles or like weighting agent and the plurality of colloidal particles will be referred to as the "weighting mixture." In some embodiments, the barite particles or like weighting agent comprise greater than about 90% of the weighting mixture by weight. In some embodiments, the barite particles or like weighting agent comprise between about 90% and about 99% of the weighting mixture by weight. Accordingly, in such embodiments, the plurality of colloidal particles comprise between about 1% and about 10% of the weighting mixture by weight. In some embodiments, the plurality of colloidal particles comprise up to about 10% of the weighting mixture by weight.

In some embodiments, the weighting mixture has particles (both barite particles and colloidal particles) in which about 6% to about 80% of the particles are 20 microns or larger in size. In some embodiments, the weighting mixture has particles (both barite particles and colloidal particles) in which at least about 95% of the particles are 50 microns or less in size. In some embodiments, the barite particles used in the present embodiments are American Petroleum Institute (API)-barite particles or barite particles having a like size distribution. According to API standards, API barite has a particle size distribution ranging substantially between 3 and 74 microns and a specific gravity of at least 4.20 g/cm$^3$. Table 1 shows a listing of particle size distribution measured in a typical sample of API barite.

TABLE 1

| SIZE RANGE (MICRONS) | % PARTICLES, TYPICAL API BARITE |
|---|---|
| <1 | 0.85 |
| 1-4 | 7.40 |
| 4-8 | 6.25 |
| 8-12 | 5.25 |
| 12-16 | 4.75 |
| 16-20 | 4.50 |
| >20 | 71.00 |
| | 100% |

In at least some embodiments, Applicants have found that removal of large particles from the barite source advantageously decreases the propensity for barite sag to occur in the present drilling fluids. According to Stokes' Law, the frictional force required for suspending a particle is directly proportional to the particle's radius. Without being bound by theory or mechanism, Applicants believe that the reduced propensity for barite sag when using smaller barite particles is at least partially due to decreased frictional forces necessary to keep the barite particles suspended in the invert emulsion. Most importantly, smaller barite particles produce a similar density adjustment to that produced using a comparable weight of API barite or other similarly sized barite source in the present drilling fluids. Surprisingly, the use of smaller barite particles in the present drilling fluids also improves the drilling fluid's rheology performance, thereby making drilling fluids containing smaller barite particles particularly well suited for downhole use.

As a non-limiting example, smaller barite particles can be prepared by grinding API barite or any other barite source and passing the ground barite through a sieve or mesh screen to provide barite particles having a desired size range. For example, in some embodiments, ground barite can be passed through a 325 mesh screen to produce barite particles that are less than 45 microns in size. Other sizing techniques and size ranges may be envisioned by those of ordinary skill in the art. Table 2 shows a listing of particle size distributions in a typical ground barite that can be passed through a 325 mesh screen. Such a sized barite is available from R.E. Carroll, Inc. as "CIMBAR #22 BARYTES".

TABLE 2

| SIZE RANGE (MICRONS) | % PARTICLES, TYPICAL 325 MESH BARITE |
|---|---|
| <1 | 1.80 |
| 1-4 | 13.70 |
| 4-8 | 15.00 |
| 8-12 | 14.25 |
| 12-16 | 16.25 |
| 16-20 | 14.50 |
| >20 | 24.50 |
| | 100% |

By grinding barite particles to smaller sizes, the surface area to mass ratio per particle can be reduced. While reduced particle mass can be an advantage in the present embodiments, Applicants believe, without being bound by theory or mechanism, that the increase in available surface area allows for greater interaction between the surfactant and the colloidal particles in forming a stronger associative supporting structure. This feature complements the reduced frictional force needed to hold small barite particles suspended in the present invert emulsion drilling fluids and results in a further reduction of the barite sag potential.

In some embodiments, the barite particles of the present invention are substantially spherical. Although the present invention has been described using certain types of sized barite, one of ordinary skill in the art given the benefit of the present disclosure can appreciate that any barite source having an average particle size less than that of API barite or any other barite source of comparable size can be used in the present invention.

As used herein, the term "colloidal particles" refers to any solid particles that are capable of being suspended in an invert emulsion drilling fluid and have at least one dimension that is less than about 5 microns in size. The shape of the colloidal particles suitable for use in the present invention can vary without limitation and can be, for example, rods, spheres, platelets, needles, fibers, rings, tubes, cylinders and the like. In colloidal particles having a large aspect ratio (e.g., rods, cylinders and tubes), the diameter of the colloidal particle can be less than 5 microns in size, whereas their length can exceed this value. For example, in the clay mineral sepiolite, the colloidal particles have an average length of 1-2 microns but a width of only about 100 nm. Colloidal particles containing sepiolite are commercially available from Halliburton Energy Services in the drilling fluid additive "TAU-MOD." In some embodiments, the colloidal particles have an average size ($d_{50}$) between about 0.5 microns and about 5 microns. In other embodiments, the colloidal particles are less than about 2 microns in size. As another illustrative example, the clay mineral bentonite contains colloidal particles that are less than about 2 microns in size. In some embodiments, the colloidal particles are nanoparticles, meaning that they have at least one dimension that is less than about 1000 nm in size.

Colloidal particles suitable for practicing the present invention can be natural or synthetic materials. Illustrative colloidal particles can include, without limitation, ground minerals (e.g., zeolite particles, sepiolite particles, attapulgite particles, illite particles, montmorillonite particles, non-organophilic clay particles, bentonite particles, quartz particles, calcium carbonate particles, silica flour particles, calcium hydroxide particles, magnesium hydroxide particles, hydroxyapatite particles, and alumoxane particles and the like), graphite, carbon nanostructures (e.g., carbon nanotubes, fullerenes, graphene, graphite oxide and the like), and non-carbon nanostructures (e.g., metal nanoparticles, metal nanorods, metal nanospheres, metal nanoplatelets, non-metal nanoparticles, non-metal nanorods, non-metal nanospheres, non-metal nanoplatelets, metal oxide nanoparticles, metal oxide nanorods, metal oxide nanospheres, metal oxide nanoplatelets, hollow microspheres, and hollow nanospheres), glass spheres and particles comprising a fibrous material (e.g., sepiolite). Applicants have found that fibrous colloidal materials, in particular, can produce drilling fluids having good ECDs. Without being bound by theory or mechanism, it is believed that using multiple types of colloidal particles having a range of shapes, sizes and native surface characteristics can provide superior barite sag performance and better rheological properties than that attainable with a single type of colloidal particle or a mixture of colloidal particles having a narrow size distribution range. In some embodiments, a mixture of two or more different types of colloidal particles having different average sizes can be used in practicing the present invention.

In some embodiments, at least a portion of the colloidal particles comprise calcium carbonate. In some of these embodiments, the calcium carbonate can have an average diameter ranging between about 1 micron and about 5 microns. In some embodiments, the calcium carbonate has an average diameter of less than about 5 microns in size. In other embodiments, the calcium carbonate has an average diameter of less than about 3 microns in size. In still other embodiments, the calcium carbonate has an average diameter of less than about 2 microns in size. Illustrative commercial calcium carbonate products include, for example, "BARACARB 5" and "BARACARB 50" (available from Halliburton Energy Services in Houston, Tex.), "ULTRACARB 2" (available from TBC Brinadd in Houston, Tex.) and "EXCAL 3" (available from Excalibar Minerals, LLC in Houston, Tex.).

In some embodiments, a ratio of the size of the barite particles to the size of the colloidal particles is at most about 1:9. In other embodiments, the ratio of the size of the barite particles to the size of the colloidal particles is at most about 5. In still other embodiments, the ratio of the size of the barite particles to the size of the colloidal particles is at most about 2.

In various embodiments, drilling fluids of the present invention can optionally contain additional additives such as, for example, fluid loss control agents, corrosion inhibitors, gelling agents, rheology control agents or thinners (e.g., "COLDTROL," an alcohol derivative; "ATC," a modified fatty acid ester; "OMC2," an oligomeric fatty acid; and/or "DEEP-TREAT," a sodium sulfonate salt), viscosity enhancers (e.g., "RHEMOD L," a modified fatty acid; and/or "VIS-PLUS," a carboxylic acid), temporary viscosifying agents (e.g., "TEMPERUS," a modified fatty acid), filtration control additives (e.g., "ADAPTA," a methylstyrene/acrylate copolymer), high temperature/high pressure control additives (e.g., "FACTANT," a highly concentrated tall oil derivative), emulsification additives (e.g., "LE SUPERMUL," a polyaminated fatty acid; and/or "LE MUL," a blend of oxidized tall oil and a polyaminated fatty acid). All of the aforementioned commercial products are available from Halliburton Energy Services of Houston, Tex. One of ordinary skill in the art will recognize that a number of additional additives are known in the art and can be included in the drilling fluids of the present invention through routine experimentation.

As noted above, the associative supporting structure of the present embodiments is advantageously formed in the drilling fluid before placement of the drilling fluid in a subterranean formation. Typically, the drilling fluids are formulated at a production facility and mixed by applying a shearing force to the drilling fluid. Without being bound by theory or mechanism, Applicants believe that application of the shearing force results in formation of aqueous fluid micelles in an oleaginous fluid continuous phase, which are stabilized by the surfactant. Still without being bound by theory or mechanism, Applicants believe that at least a portion of the colloidal particles interact with the surfactant in the micelles to form an associative supporting structure for barite particles or like weighting agent suspended in the invert emulsion. Once formed, the associative supporting structure is stable in the absence of a shearing force, such that the drilling fluids of the present invention have a reduced tendency toward barite sag. In some embodiments, the associative supporting structure inhibits sag of the barite particles for at least about 62 hours, as measured by the drilling fluid having a change in density of less than about 5% over this time.

As used herein, the term "sag rate" indicates the relative velocity of weighted material that might settle in a fluid over a given unit time. According to one embodiment, the sag rate in an invert emulsion drilling fluid can be measured by dynamic high angle sag testing (DHAST). According to such embodiments, the sag rate can be determined at 5 fixed shear rates: $0.35\ s^{-1}$, $1.76\ s^{-1}$, $10.55\ s^{-1}$, $21.09\ s^{-1}$, and static ($0\ s^{-1}$). Based on the DHAST sag rate profile, the invert emulsion can be classified with respect to its suitability for use in deviated wellbores. Further information regarding DHAST sag rate measurements are described in U.S. Pat. No. 6,584,833, which is incorporated herein by reference in its entirety.

In some embodiments, drilling fluids of the present invention have a sag rate of at most about 10 mm/hr. In other embodiments, drilling fluids of the present invention have a sag rate of at most about 5 mm/hr. In still other embodiments, drilling fluids of the present invention have a sag rate of at most about 3 mm/hr.

As used herein, the term "yield point" refers to a parameter of the Bingham plastic model, where yield point refers to the yield stress extrapolated to a shear rate of zero. This extrapolation is commonly made from the highest shear rate readings at 600 and 300 rpm on a Fann 35 rheometer using standard F1 springs. As used herein, "yield stress" refers to the torque required to just start a fluid moving from rest in a rheometer measurement. The yield stress is also commonly extrapolated from several viscometer readings at differing shear rates. In some embodiments, drilling fluids of the present invention have yield points ranging from about 2.4 to about 7.2 Pa. In rheometer measurements, the yield stress can be approximated by the 3 rpm reading on the standard Fann 35 rheometer. The yield stress can also be evaluated by step-down vane rheology measurement.

As used herein, the term "gel strength" refers to the shear stress measured at a low shear rate after a drilling fluid has set quiescently for a set period of time. According to standard API procedures, the gel strength is measured after setting for 10 seconds and 10 minutes, although measurements at longer time intervals can also be made such as, for example, 30 minutes or 16 hours. The shear stress is related to the yield stress by the following three-parameter equation:

$$\tau = \tau_0 + k(\gamma)^n,$$

where $\tau$ is the shear stress, $\tau_0$ is the yield stress, $k(\gamma)$ is the consistency, and n is a real number. As noted above, $k(\gamma)$ and n are fit graphically or calculated from the 600 and 300 rpm rheometer readings. In various embodiments, drilling fluids of the present embodiments have gel strengths ranging from about 15 to about 35 measured after either 10 or 30 minutes of quiescence.

Incorporation of colloidal particles in the present drilling fluids beneficially does not result in a substantial change of the high shear rheological profile of the drilling fluid. As used herein, a substantial change in the rheological profile of the drilling fluid is defined as a 600 rpm rheology measurement increasing by more than about 20% after incorporation of colloidal particles. Stated another way, the incorporation of colloidal particles in the present drilling fluids does not cause the drilling fluids to become overly viscous. Although the incorporation of colloidal particles does not substantially change the rheological profile of the present drilling fluids by making them become overly viscous, more subtle changes in the rheological profile can be realized that make them more suitable for use in drilling applications, as discussed hereinafter.

Figure 2:
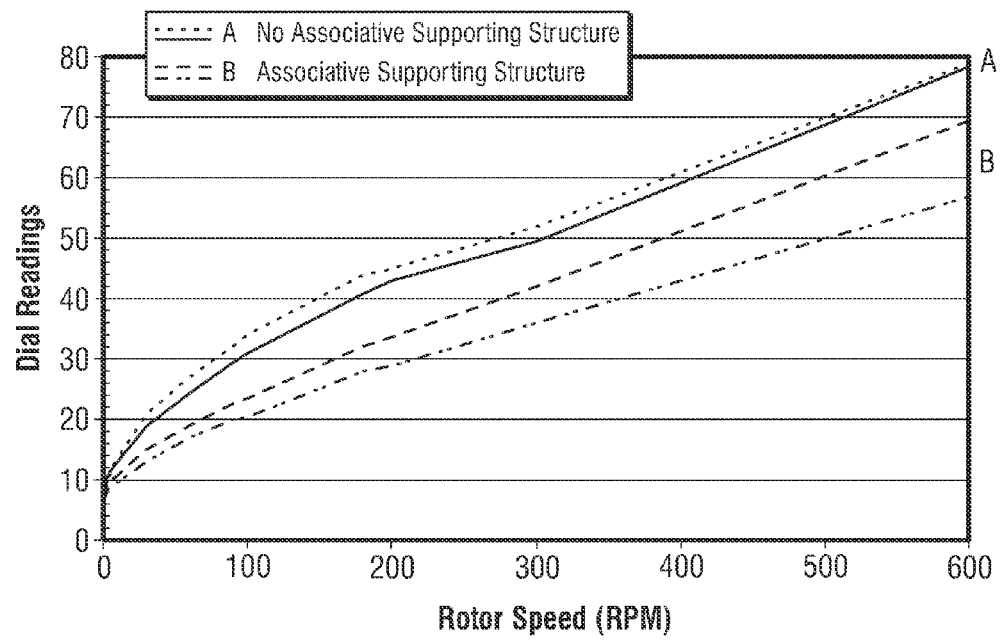
FIGS. 2 and 3 show rheology profiles for illustrative drilling fluids of the present invention compared to those not containing an associative supporting structure.
Figure 3:
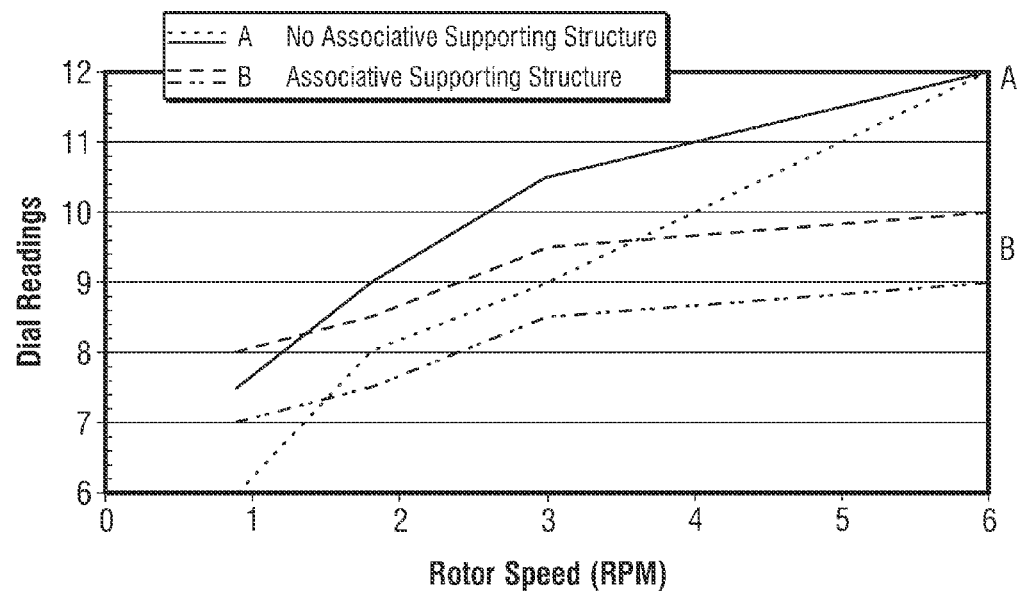

In some embodiments, drilling fluids of the present invention have a lower high shear rheological profile (e.g., 300-600 rpm) than does a comparable drilling fluid without colloidal particles. Concurrently, the drilling fluids of the present invention have a higher low shear rheological profile (e.g., 0.9-10 rpm) than does a comparable drilling fluid without colloidal particles. FIGS. 2 and 3 show rheology profiles for illustrative drilling fluids of the present invention compared to those not containing an associative supporting structure. FIG. 2 shows the complete rheology profile from 600 rpm to 0.9 rpm, particularly emphasizing the high shear range where the drilling fluids of the present invention have a lower rheological profile. FIG. 3 shows an expansion of the low shear region of FIG. 2, where the drilling fluids of the present invention have a higher rheological profile. Regarding FIGS. 2 and 3, it should be noted that the drilling fluids of the present invention were tested after 62 hours of static aging at 200° F., whereas the conventional drilling fluids not containing colloidal particles were tested after only 16 hours of dynamic aging at 150° F. due to barite sag issues. Accordingly, drilling fluids of the present invention are desirably less viscous during formulation and downhole pumping but maintain a higher low-shear viscosity downhole for improved performance over drilling fluids not containing colloidal particles.

To facilitate a better understanding of the present invention, the following examples of preferred embodiments are given. In no way should the following examples be read to limit, or to define, the scope of the invention.

EXAMPLES

Example 1

Preparation of Drilling Fluids and Density Measurements Thereof

Drilling fluid formulations were prepared in accordance with the compositions outlined in Tables 3-6 and mixed through application of a shearing force. The amounts of colloidal particles and barite were chosen to achieve a nominal density of 14.0 lb/gal in a standard "ENCORE" oleaginous base fluid. Mixing was performed on 350 mL quantities of formulated drilling fluid using a Multimixer Model 95B5. The indicated amount of oleaginous base fluid was combined with an emulsifier and mixed for 2 minutes, during which time lime was added. At this time, the sample was removed from the mixer, and water and brine were added accordingly. Samples were then further mixed for 15 minutes, and "ADAPTA" was then added with 6 minutes of additional mixing conducted. Calcium carbonate was then added and mixed for 10 minutes. In the event calcium carbonate was not added, the total mixing time was kept the same as if it had been. "TAU-MOD" and "AQUAGEL GOLD SEAL" were then added and mixed for 15 minutes. In the event these agents were not added, the total mixing time was kept the same as if they had been. "RHEMOD-L" was then added and mixed for 15 minutes. Following mixing, the samples were sheared using a Silverson L4RT high shear mixer equipped with a square hole screen. Silverson shearing was performed at 7000 rpm for 15 minutes. A water bath was maintained around the sample to keep the temperature below 150° F. The sample was then hot rolled for 16 hours at 150° F. prior to testing.

Viscosity measurements were conducted using a Fann Model 35 direct reading rotational viscometer. Step-down vane rheology measurements were performed on a Brookfield DV-II+ viscometer with an LV spring and a 4-fin vane spindle geometry. The sample was preheated to 120° F. prior to testing, and 100 rpm readings were then measured every 30 seconds for 10 minutes before stepping down the rotation rate. Each successive rotation rate (50, 25, 12, 6, 3, 1.5, 0.5, 0.1 and 0.05 rpm) was run for 2 minutes with readings being taken every 10 seconds.

Static aging and density measurements were carried out as outlined below.

After preparation and initial characterization of the drilling fluid formulations, samples were placed in aging cells, and the samples were aged for the indicated length of time at 200° F. Measurement of the post-aging density was conducted as follows:

1. Use a spatula to stir the top of the column in the aging cell, taking care not to disturb the bottom;
2. Pour out the top section of fluid, using a spatula to assist in removal, and leaving the bottom 1½" of fluid undisturbed;
3. Stir the remaining fluid to homogenize, and then pour the fluid to ¼" from the top lip of a calibrated pressurized balance;
4. Close the pressurized balance and tighten the lid screw until mud emerges from the top valve;
5. Depress the lid onto the scale the rest of the way using the plunger and fully tighten the screw;
6. Fill the plunger with 2-3" of mud from the cell and compress into the chamber; and
7. Weigh the entire scale and back calculate the density of the fluid in the bottom of the aging cell.

The drilling fluid formulations exemplified in Tables 3-6 were prepared from a standard "ENCORE" drilling fluid base that is available from Halliburton Energy Services. This drilling fluid utilizes a mixture of internal olefins as the oleaginous fluid continuous phase. In addition to the internal olefin continuous phase, the "ENCORE" drilling fluid further contains "LE SUPERMUL," "RHEMOD-L" and "ADAPTA." "LE SUPERMUL," a polyaminated fatty acid, is a surfactant. "RHEMOD-L," a modified fatty acid, is a viscosity enhancer that further helps to increase the low shear rheological properties of the drilling fluid. "ADAPTA," a co-polymer particulate material, is a filtration control additive that provides thin, low solids filter cakes.

In addition to the standard components of "ENCORE," various colloidal particles were added to prepare the present drilling fluid formulations. "BARACARB 5" and "BARACARB 50" are ground marble compositions, having $d_{50}$ sizes of 5 microns and 50 microns, respectively. "ULTRACARB 2" is a sized calcium carbonate material having a $d_{50}$ of 2 microns. "EXCAL 3" is a sized calcium carbonate material having a $d_{50}$ of 3 microns. "AQUAGEL GOLD SEAL" is a bentonite material that is available from Halliburton Energy Services. "TAU-MOD" is an amorphous/fibrous material that is available from Halliburton Energy Services. "TAU-MOD" contains the fibrous clay mineral sepiolite. Oil Company Materials Association (OCMA) clay was added to some of the drilling fluid formulations to simulate the accumulation of drill cuttings in a drilling operation.

Various barite sources were used in preparing the present drilling fluid formulations. Unless indicated otherwise, API barite was used. #325 barite refers to barite having a particle size of 45 microns or less. Unless indicated otherwise, #325 barite refers to "CIMBAR #22 BARYTES."

Table 3 shows initial drilling fluid formulations tested, both before and after static aging at 200° F. An initial formulation (formulation 27) without added calcium carbonate particles was unstable upon extended aging, as evidenced by a significant density change occurring over 16 hours of aging, which is indicative of barite sag. Further density change occurred in this formulation when the aging period was extended to 62 hours. Formulations 28, 33 and 39 showed increased density stability upon the incorporation of calcium carbonate particles. Although these formulations had acceptably small density changes at 16 hours, a significant change in density was observed at 62 hours aging in formulation 33.

TABLE 3

| | FLUID FORMULATIONS | | | | | | | | | |
|---|---|---|---|---|---|---|---|---|---|---|
| | 27 | 27A | 27B | 28 | 28A | 33A | 33B | 33C | 39 | 39A |
| BASE OIL, BBL | | 0.5536 | | | 0.5133 | | 0.5004 | | | 0.5376 |
| OWR | | 80/20 | | | 75/25 | | 75/25 | | | 80/20 |
| LE SUPERMUL, LB | | 11 | | | 11 | | 15 | | | 11 |
| LIME, LB | | 2 | | | 2 | | 2 | | | 2 |
| WATER, BBL | | 0.0839 | | | 0.1042 | | 0.1042 | | | 0.0816 |
| CaCl$_2$ BRINE, BBL | | 0.0757 | | | 0.0940 | | 0.0939 | | | 0.0736 |
| ADAPTA, LB | | 2 | | | 2 | | 2 | | | 2 |
| API BARITE, LB | | 346.0 | | | 324.5 | | 323.5 | | | 312.5 |
| BARACARB 5, LB | | — | | | 10 | | 10 | | | 10 |
| BARACARB 50, LB | | — | | | 10 | | 10 | | | 10 |
| TAU-MOD, LB | | 6 | | | 4 | | 4 | | | 6 |
| OCMA CLAY, LB | | — | | | — | | — | | | 20 |
| RHEMOD L, LB | | 1 | | | 1 | | 1 | | | 1 |
| SHEARED, MIN | 15 | 15 | 15 | 15 | 15 | 15 | 15 | 15 | 15 | 15 |
| STATIC AGE, HR AT 200° F. | | 16 | 62 | | 16 | | 16 | 62 | | 16 |
| DIAL READING AT 150° F. | | | | | | | | | | |
| 600 RPM | 58 | 55 | 56.5 | 70 | 65 | 69 | 68 | 58 | 75 | 72 |
| 300 RPM | 34 | 32.5 | 32.5 | 42 | 42 | 40.5 | 40 | 30 | 45 | 47 |
| 200 RPM | 25 | 24 | 24 | 32 | 30 | 33.5 | 30 | 22 | 36 | 37 |
| 180 RPM | 24 | 22 | 23.5 | 31 | 28 | 32 | 30 | 20 | 37 | 34 |
| 100 RPM | 16 | 15 | 16 | 22 | 20 | 28 | 21 | 13 | 26 | 26 |
| 90 RPM | 15 | 14.5 | 15.5 | 21 | 19 | 22 | 20 | 13 | 26 | 24 |
| 60 RPM | 13 | 12 | 13.5 | 17 | 16 | 18.5 | 17 | 10 | 22 | 20 |
| 30 RPM | 10 | 9 | 10 | 13 | 12 | 14 | 12 | 7 | 18 | 16 |
| 6 RPM | 7 | 6 | 7 | 8 | 8 | 9 | 8 | 4 | 13 | 11 |
| 3 RPM | 7 | 5.5 | 6.5 | 8 | 7 | 8.5 | 7 | 3 | 12 | 11 |
| 1.8 RPM | 6 | 5 | 6 | 7 | 6 | 7.5 | 6 | 3 | 11 | 11 |
| 0.9 RPM | 6.5 | 5 | 6 | 6 | 6 | 7.5 | 5 | 3 | 12 | 10 |
| SUMMARY DATA | | | | | | | | | | |
| PLASTIC VISCOSITY, CP | 24 | 22.5 | 24 | 28 | 23 | 28.5 | 28 | 28 | 30 | 25 |
| YIELD POINT, LB/100 FT$^2$ | 10 | 10 | 8.5 | 14 | 19 | 12 | 12 | 10 | 15 | 22 |
| 10 SEC GEL, LB/100 FT$^2$ | 9 | 10 | 8.5 | 12 | 8 | 9 | 10 | 8 | 18 | 15 |
| 10 MIN GEL, LB/100 FT$^2$ | 43 | 29.5 | 24 | 32 | 30 | 26 | 27 | 26 | 34 | 32 |
| 30 MIN GEL, LB/100 FT$^2$ | 50 | 35 | 42 | 38 | 35 | 31 | 29 | 28 | 39 | 46 |
| ELECTRICAL STABILITY, V | 1289 | 1350 | 1200 | 960 | 991 | 925 | 1049 | 767 | 1345 | 1602 |
| VOLUME TOP OIL, ML | | 4 | 38 | | 6 | | 3 | 14 | | 1 |
| BOTTOM MUD DENSITY | | 14.3 | 15.33 | | 14.25 | | 13.94 | 15.05 | | 14.23 |
| INITIAL SAMPLE DENSITY | | 14.0 | 14.0 | | 14.0 | | 14.0 | 14.3 | | 14.2 |
| DENSITY CHANGE, LB/GAL | | 0.30 | 1.18 | | 0.25 | | 0 | 0.75 | | 0.03 |

Figure 4:
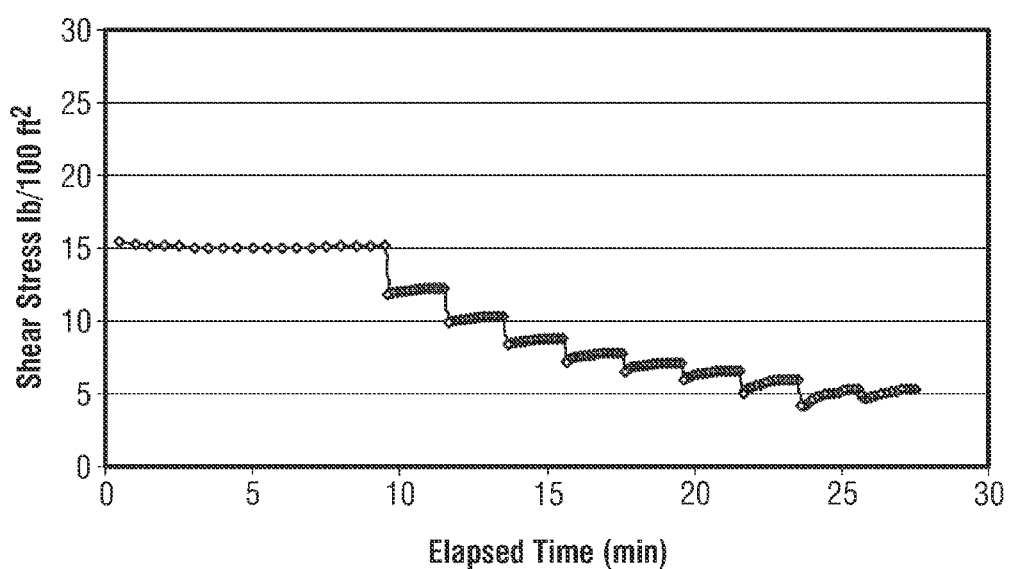
FIG. 4 shows an illustrative step-down vane rheology plot for formulation 33 without static aging.

FIG. 4 shows an illustrative step-down vane rheology plot for formulation 33 without static aging.

From these initial formulations, a partially optimized baseline formulation was identified and tested for further optimization with different types of colloidal particles. Formulation and testing data for the partially optimized formulation (formulation 52) is set forth in Table 4. The OWR was held constant at 77/23 for the partially optimized formulations. As shown in Table 4, this formulation did experience some density change upon 62 hours of aging. Substitution of "ULTRACARB 2" for "BARACARB 5" in formulation 52 produced formulation 60, which displayed a greater than 5-fold improvement in density change stability over 62 hours of static aging. Formulation 60 also had superior low shear rheology compared to formulation 52.

TABLE 4

| | FLUID FORMULATIONS | | | |
|---|---|---|---|---|
| | 52 | 52A | 60 | 60A |
| BASE OIL, BBL | 0.5193 | | 0.5067 | |
| OWR | 77/23 | | 77/23 | |
| LE SUPERMUL, LB | 14 | | 14 | |
| LIME, LB | 4 | | 4 | |
| WATER, BBL | 0.0960 | | 0.0950 | |
| CaCl$_2$ BRINE, BBL | 0.0866 | | 0.0854 | |
| ADAPTA, LB | 2 | | 2 | |
| API BARITE, LB | 330.0 | | 330.3 | |
| BARACARB 5, LB | 10 | | — | |
| ULTRACARB 2, LB | — | | 10 | |
| TAU-MOD, LB | 4 | | 4 | |
| BENTONITE, LB | 4 | | 4 | |
| RHEMOD L, LB | 1 | | 1 | |
| SHEARED, MIN | 15 | 15 | 15 | 15 |
| STATIC AGE, HR AT 200° F. | | 62 | | 62 |
| DIAL READING AT 150° F. | | | | |
| 600 RPM | 66 | 60 | 75 | 69.5 |
| 300 RPM | 42 | 34 | 49 | 42 |
| 200 RPM | 33 | 27 | 38 | 33.5 |
| 180 RPM | 31 | 26 | 35 | 32 |
| 100 RPM | 22 | 18 | 26 | 23.5 |
| 90 RPM | 21 | 17 | 24 | 22.5 |
| 60 RPM | 17.5 | 14 | 20 | 19 |
| 30 RPM | 13 | 11 | 16 | 15 |
| 6 RPM | 9 | 7 | 10 | 10 |
| 3 RPM | 8 | 6 | 9 | 9.5 |
| 1.8 RPM | 7 | 5.5 | 9 | 8.5 |
| 0.9 RPM | 7 | 5 | 8 | 8 |
| SUMMARY DATA | | | | |
| PLASTIC VISCOSITY, CP | 24 | 26 | 26 | 27 |
| YIELD POINT, LB/100 FT$^2$ | 18 | 8 | 23 | 15 |
| 10 SEC GEL, LB/100 FT$^2$ | 10 | 8 | 13 | 12 |
| 10 MIN GEL, LB/100 FT$^2$ | 26 | 23 | 31 | 28 |
| 30 MIN GEL, LB/100 FT$^2$ | 39 | 27 | 36 | 32 |
| ELECTRICAL STABILITY, V | 987 | 1169 | 971 | 1254 |
| VOLUME TOP OIL, ML | | 7 | | 6.5 |
| BOTTOM MUD DENSITY | | 14.70 | | 14.47 |
| INITIAL SAMPLE DENSITY | | 14.00 | | 14.3 |
| DENSITY CHANGE, LB/GAL | | 0.70 | | 0.17 |

Figure 5:
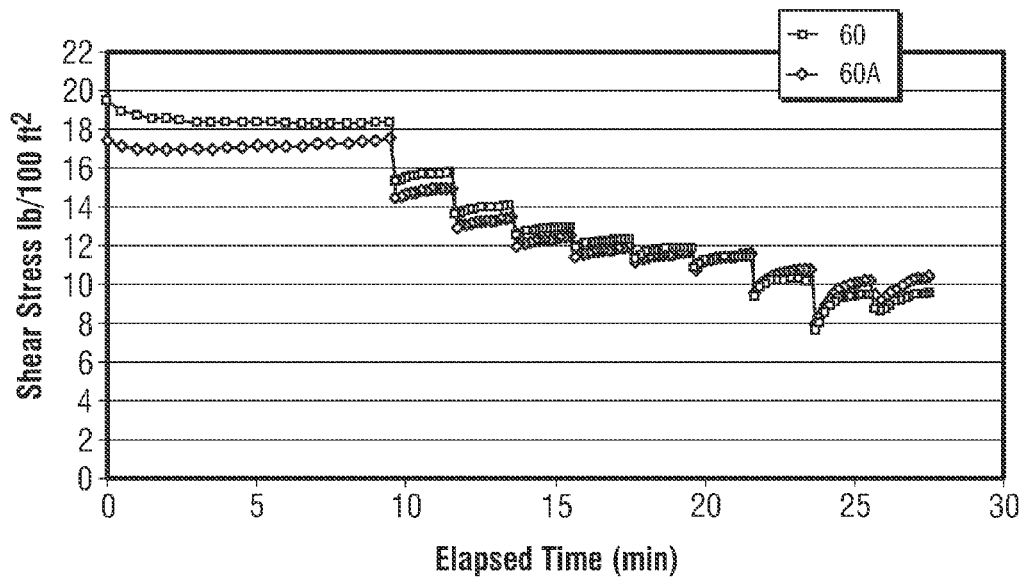
FIG. 5 shows an illustrative step-down vane rheology plot for formulation 60 as initially prepared and after 62 hours of static aging at 200° F.

FIG. 5 shows an illustrative step-down vane rheology plot for formulation 60 as initially prepared and after 62 hours of static aging at 200° F. This result indicates that an associative supporting structure was formed in this drilling fluid and maintained over the static aging period.

Formulation and testing data for formulations having different sizes of barite particles is shown in Table 5. Substitution of the API barite in formulation 73 with "CIMBAR #22 BARYTES" in formulation 74 provided samples having comparable density stability and rheological behavior. Substitution of "EXCAL 3" for "ULTRACARB 2" produced similar results to those of formulations 73 and 74 (data not shown). Since the low shear rheological behavior of formulations 73 and 74 were approximately the same, the smaller barite particles are capable of providing comparable downhole performance.

TABLE 5

| | FLUID FORMULATIONS | | | |
|---|---|---|---|---|
| | 73 | 73A | 74 | 74A |
| BASE OIL, BBL | 0.5041 | | 0.4987 | |
| OWR | 77/23 | | 77/23 | |
| LE SUPERMUL, LB | 16 | | 16 | |
| LIME, LB | 4 | | 4 | |
| WATER, BBL | 0.0945 | | 0.0936 | |
| CaCl$_2$ BRINE, BBL | 0.0852 | | 0.0844 | |
| ADAPTA, LB | 2 | | 2 | |
| #325 BARITE, LB | 353.6 | | — | |
| API BARITE, LB | — | | 355.9 | |
| EXCAL 3, LB | 10 | | 10 | |
| TAU-MOD, LB | 4 | | 4 | |
| AQUAGEL GOLD SEAL, LB | 4 | | 4 | |
| RHEMOD L, LB | 1 | | 1 | |
| SHEARED, MIN | 15 | 15 | 15 | 15 |
| STATIC AGE, HR AT 200° F. | | 62 | | 62 |
| DIAL READING AT 150° F. | | | | |
| 600 RPM | 62.5 | 62 | 68 | 65 |
| 300 RPM | 40 | 37 | 43.5 | 40 |
| 200 RPM | 32 | 34.5 | 34.5 | 30.5 |
| 180 RPM | 32 | 28.5 | 34.5 | 29.5 |
| 100 RPM | 22.5 | 21 | 24 | 21 |
| 90 RPM | 22.5 | 20.5 | 24 | 20 |
| 60 RPM | 18.5 | 17 | 23 | 16.5 |
| 30 RPM | 14.5 | 13.5 | 18.5 | 12 |
| 6 RPM | 9 | 9 | 9.5 | 8 |
| 3 RPM | 8 | 8 | 9 | 7 |
| 1.8 RPM | 7.5 | 7.5 | 8.5 | 6.5 |
| 0.9 RPM | 7 | 7 | 8 | 6 |
| SUMMARY DATA | | | | |
| PLASTIC VISCOSITY, CP | 22.5 | 25 | 24.5 | 25 |
| YIELD POINT, LB/100 FT$^2$ | 17.5 | 12 | 19 | 15 |
| 10 SEC GEL, LB/100 FT$^2$ | 10 | 11 | 11.5 | 19 |
| 10 MIN GEL, LB/100 FT$^2$ | 19 | 24 | 21 | 22 |
| 30 MIN GEL, LB/100 FT$^2$ | 18 | 24 | 22 | 24.5 |
| ELECTRICAL STABILITY, V | 1523 | 1080 | 1397 | 1250 |
| VOLUME TOP OIL, ML | | 5 | | 6 |
| BOTTOM MUD DENSITY | | 15.28 | | 15.07 |
| INITIAL SAMPLE DENSITY | | 14.79 | | 14.72 |
| DENSITY CHANGE, LB/GAL | | 0.49 | | 0.35 |

Figure 6:
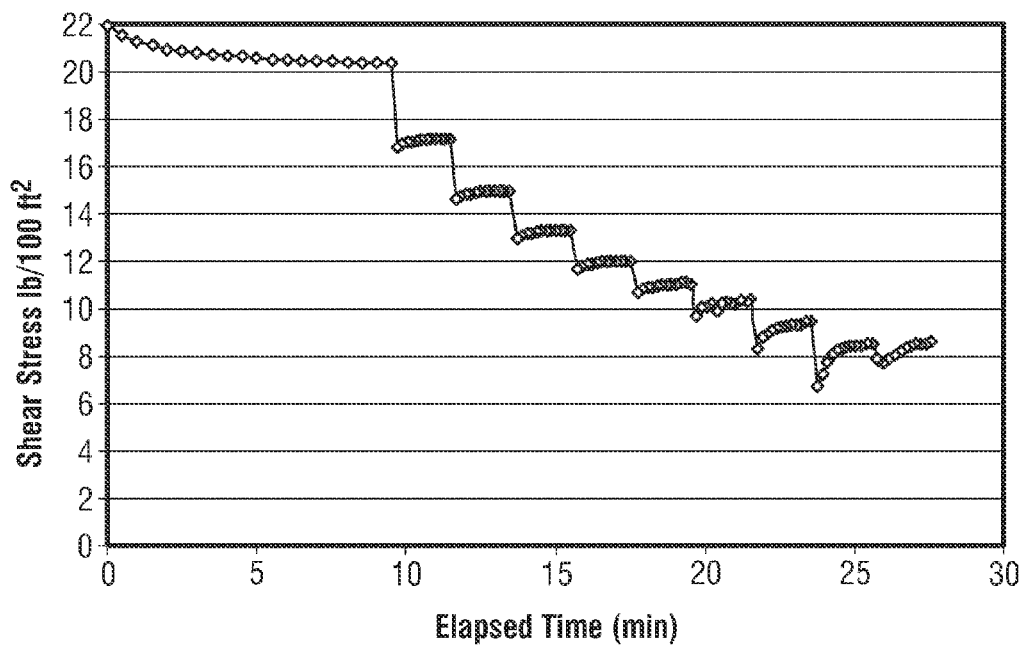
FIG. 6 shows an illustrative step-down vane rheology plot for formulation 73 after 62 hours of static aging at 200° F.

FIG. 6 shows an illustrative step-down vane rheology plot for formulation 73 after 62 hours of static aging at 200° F.

Additional optimization was conducted on the formulations having smaller barite particles. Formulation and testing data for samples containing smaller barite particles is summarized in Table 6. As shown in Table 6, further improvement in the long-term density stability was achieved in formulations 52, 57 and 57'. Formulations 57 and 57' are duplicate samples demonstrating that the density stabilization and rheology enhancement were highly reproducible effects.

TABLE 6

| | \multicolumn{6}{c}{FLUID FORMULATIONS} | | | | | |
|---|---|---|---|---|---|---|
| | 54 | 54A | 57 | 57A | 57' | 57A' |
| BASE OIL, BBL | 0.5280 | | | 0.5198 | | |
| OWR | 77/23 | | | 77/23 | | |
| LE SUPERMUL, LB | 14 | | | 14 | | |
| LIME, LB | 4 | | | 4 | | |
| WATER, BBL | 0.0975 | | | 0.0973 | | |
| CaCl₂ BRINE, BBL | 0.0879 | | | 0.08776 | | |
| ADAPTA, LB | 2 | | | 2 | | |
| #325 BARITE, LB | 325.5 | | | 324.65 | | |
| BARACARB 5, LB | 10 | | | 10 | | |
| TAU-MOD, LB | 4 | | | 6 | | |
| AQUAGEL GOLD SEAL, LB | 4 | | | 4 | | |
| RHEMOD L, LB | 1 | | | 1 | | |
| SHEARED, MIN | 15 | 15 | 15 | 15 | 15 | 15 |
| STATIC AGE, HR AT 200° F. | — | 62 | — | 62 | — | 62 |
| \multicolumn{7}{c}{DIAL READING AT 150° F.} | | | | | | |
| 600 RPM | 56 | 57 | 64 | 54 | 59 | 56 |
| 300 RPM | 36 | 36 | 41 | 34 | 38 | 34.5 |
| 200 RPM | 28 | 29 | 32 | 27 | 30 | 26.5 |
| 180 RPM | 28 | 28 | 30 | 25 | 29 | 26 |
| 100 RPM | 20 | 20 | 22 | 18 | 20 | 18.5 |
| 90 RPM | 20 | 20 | 21 | 18 | 19.5 | 18 |
| 60 RPM | 17 | 17 | 18 | 15 | 16 | 14.5 |
| 30 RPM | 10 | 13 | 13 | 12 | 13 | 11.5 |
| 6 RPM | 9 | 9 | 9 | 7 | 8 | 8 |
| 3 RPM | 8 | 8.5 | 8 | 7 | 7 | 7 |
| 1.8 RPM | 7 | 7.5 | 7 | 7 | 6.5 | 6.5 |
| 0.9 RPM | 6 | 7 | 7 | 6 | 6 | 6 |
| \multicolumn{7}{c}{SUMMARY DATA} | | | | | | |
| PLASTIC VISCOSITY, CP | 20 | 21 | 23 | 20 | 21 | 21.5 |
| YIELD POINT, LB/100 FT² | 16 | 15 | 18 | 14 | 17 | 13 |
| 10 SEC GEL, LB/100 FT² | 10 | 11 | 11 | 11 | 9 | 9.5 |
| 10 MIN GEL, LB/100 FT² | 21 | 21 | 24 | 29 | 18 | 22 |
| 30 MIN GEL, LB/100 FT² | 22 | 23.5 | 28 | 34 | 19 | 28 |
| ELECTRICAL STABILITY, V | 1127 | 1086 | 1227 | 1581 | 1282 | 1185 |
| VOLUME TOP OIL, ML | | 12 | | 6 | | 5 |
| BOTTOM MUD DENSITY | | 14.9 | | 14.5 | | 14.4 |
| INITIAL SAMPLE DENSITY | | 14.7 | | 14.1 | | 14.1 |
| DENSITY CHANGE, LB/GAL | | 0.20 | | 0.40 | | 0.30 |

Attempts to replace the "TAU-MOD" and "AQUAGEL GOLD SEAL" of formulations 54 and 57 with increased amounts of "ULTRACARB 2" in formulations 66-70 failed to achieve adequate rheological properties. Formulation and testing data for these samples is shown in Table 7. Density stability testing was not conducted for these samples due to their failure to achieve acceptable rheological properties.

TABLE 7

| | \multicolumn{5}{c}{FLUID FORMULATIONS} | | | | |
|---|---|---|---|---|---|
| | 66 | 67 | 68 | 69 | 70 |
| BASE OIL, BBL | | 0.5193 | | | 0.5139 |
| OWR | | 77/23 | | | 77/23 |
| LE SUPERMUL, LB | | 14 | | | 14 |
| LIME, LB | | 4 | | | 4 |
| WATER, BBL | | 0.0960 | | | 0.0951 |
| CaCl₂ BRINE, BBL | | 0.0866 | | | 0.0858 |
| ADAPTA, LB | | — | | | — |
| #22 BARYTES, LB | | — | | | — |
| BARACARB 5, LB | 18 | — | — | — | — |
| ULTRACARB 2, LB | — | 18 | 16 | — | 36 |
| SILICA FLOUR, LB | — | — | — | 16 | — |
| TAU-MOD, LB | — | — | 2 | 2 | — |
| AQUAGEL GOLD SEAL, LB | — | — | — | — | — |
| ADAPTA, LB | | 2 | | | 2 |
| BARITE, LB | | 330.0 | | | 314.3 |

TABLE 7-continued

| | FLUID FORMULATIONS | | | | |
|---|---|---|---|---|---|
| | 66 | 67 | 68 | 69 | 70 |
| RHEMOD L, LB | 1 | 1 | 1 | 1 | 1 |
| SHEARED, MIN | 15 | 15 | 15 | 15 | 15 |
| STATIC AGE, HR 200° F. | — | — | — | — | — |
| DIAL READING AT 150° F. | | | | | |
| 600 RPM | 49 | 50 | 58 | 53 | 52.5 |
| 300 RPM | 30 | 30.5 | 38.5 | 33 | 33.5 |
| 200 RPM | 24 | 26 | 26 | 26 | 24.5 |
| 180 RPM | 24 | 25 | 24.5 | 26 | 24 |
| 100 RPM | 16 | 16.5 | 17.5 | 17 | 16.5 |
| 90 RPM | 16 | 16 | 17 | 16 | 16 |
| 60 RPM | 13 | 13 | 13.5 | 13 | 13 |
| 30 RPM | 9 | 9.5 | 10 | 10 | 9.5 |
| 6 RPM | 5 | 5 | 6 | 6 | 5 |
| 3 RPM | 4 | 4 | 5 | 4 | 4 |
| 1.8 RPM | 4 | 3.5 | 4.5 | 4 | 3.4 |
| 0.9 RPM | 3 | 2.5 | 4 | 3 | 3 |
| SUMMARY DATA | | | | | |
| PLASTIC VISCOSITY, CP | 19 | 19.5 | 19.5 | 20 | 19 |
| YIELD POINT, LB/100 FT$^2$ | 11 | 11 | 19 | 13 | 14.5 |
| 10 SEC GEL, LB/100 FT$^2$ | 6 | 5 | 6.5 | 7 | 5.5 |
| 10 MIN GEL, LB/100 FT$^2$ | 8 | 6.5 | 15.5 | 17 | 7 |
| 30 MIN GEL, LB/100 FT$^2$ | 8 | 6.5 | 18.5 | 19 | 7 |
| ELECTRICAL STABILITY, V | 978 | 935 | 975 | 928 | 951 |

Example 2

Pilot Scale Formulation and Shearing of Formulation 52

Formulation 52 was prepared at a pilot scale (300 bbls) using bit jets having a shear force of 2000+ psi applied from a HT-400 pump. Testing data for the pilot scale formulation is summarized in Table 8. The density stability and rheological properties were similar to those prepared under laboratory conditions (see Table 4). For the pilot scale samples, measurements made at the plant and later during laboratory testing revealed similar rheological properties, with the exception that gel strengths were approximately 10 units lower in value when measured in the laboratory presumably. This behavior is presumably due to the time lag between shearing and measurement. Data at 120° F. is also presented for comparison.

TABLE 8

| | FLUID FORMULATIONS | | | |
|---|---|---|---|---|
| | 52 (lab measurement) | 52 (plant measurement) | 52 (lab measurement) | 52 (plant measurement) |
| MIX TIME, MIN | 10 | — | 10 | — |
| TEMPERATURE, ° F. | 120 | 120 | 150 | 150 |
| DIAL READINGS | | | | |
| 600 RPM | 83 | 96 | 71 | 82 |
| 300 RPM | 54 | 62 | 48 | 54 |
| 200 RPM | 43 | 50 | 39 | 43 |

TABLE 8-continued

| | FLUID FORMULATIONS | | | |
|---|---|---|---|---|
| | 52 (lab measurement) | 52 (plant measurement) | 52 (lab measurement) | 52 (plant measurement) |
| 180 RPM | 42 | — | 38 | — |
| 100 RPM | 31 | 36 | 28 | 31 |
| 90 RPM | 30 | — | 27 | — |
| 60 RPM | 27 | — | 24 | — |
| 30 RPM | 21 | — | 19 | — |
| 6 RPM | 15 | 12 | 13 | 14 |
| 3 RPM | 14 | 11 | 12 | 12 |
| 1.8 RPM | 14 | — | 10 | — |
| 0.9 RPM | 13 | — | 9 | — |
| PLASTIC VISCOSITY, CP | 29 | 34 | 23 | 28 |
| YIELD POINT, LB/100 FT$^2$ | 25 | 28 | 25 | 26 |
| 10 SEC GEL, LB/100 FT$^2$ | 17 | 23 | 13 | 13 |
| 10 MIN GEL, LB/100 FT$^2$ | 28 | 36 | 21 | 30 |
| 30 MIN GEL, LB/100 FT$^2$ | 29 | 38 | 19 | 33 |
| ELECTRICAL STABILITY, V | — | — | 997 | — |

Table 9 summarizes the density stability and rheological testing data for pilot scale formulation 52 after 62 hours of static aging at 200° F. Values in Table 9 are laboratory measurements for the pilot scale-sheared samples.

TABLE 9

| DIAL READING AT 150° F. | | |
|---|---|---|
| | STATIC AGE, HR AT 200° F. | |
| | 0 | 62 |
| 600 RPM | 71 | 72 |
| 300 RPM | 48 | 47 |
| 200 RPM | 39 | 37.5 |
| 180 RPM | 38 | 36 |
| 100 RPM | 28 | 27 |
| 90 RPM | 27 | 26.5 |
| 60 RPM | 24 | 23 |
| 30 RPM | 19 | 18 |
| 6 RPM | 13 | 12 |
| 3 RPM | 12 | 10.5 |
| 1.8 RPM | 10 | 10 |
| 0.9 RPM | 9 | 9 |
| PLASTIC VISCOSITY, CP | 23 | 25 |
| YIELD POINT, LB/100 FT$^2$ | 25 | 22 |
| 10 SEC GEL, LB/100 FT$^2$ | 13 | 12 |
| 10 MIN GEL, LB/100 FT$^2$ | 21 | 20 |
| 30 MIN GEL, LB/100 FT$^2$ | 19 | 21 |
| ELECTRICAL STABILITY, V | 997 | 855 |
| VOLUME TOP OIL, ML | | 7 |
| BOTTOM MUD DENSITY | | 14.64 |
| INITIAL SAMPLE DENSITY | | 14.1 |
| DENSITY CHANGE, LB/GAL | | 0.54 |

Figure 7:
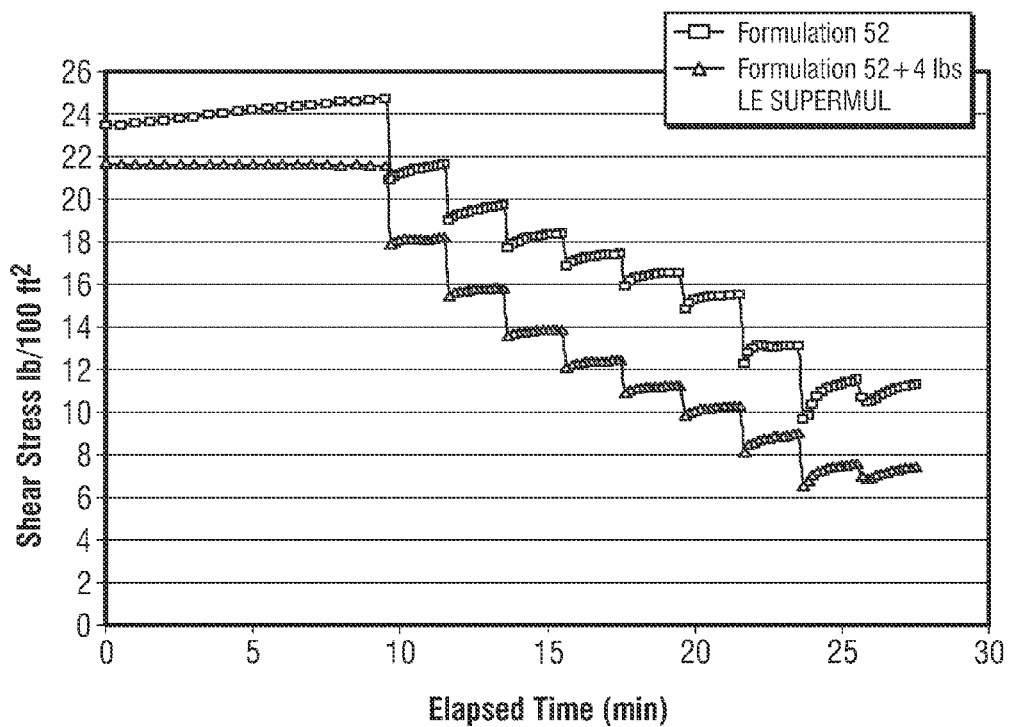
FIG. 7 shows an illustrative step-down vane rheology plot for pilot scale-sheared formulation 52 after 62 hours of static aging at 200° F.

FIG. 7 shows an illustrative step-down vane rheology plot for pilot scale-sheared formulation 52 after 62 hours of static aging at 200° F. Comparative data is also shown for a modification of formulation 52, having an additional 4 lbs. "LE SUPERMUL" included. In this case, the inclusion of the additional "LE SUPERMUL" resulted in a reduction in the rheological profile.

Example 3

Rheology Comparison Between "ACCOLADE"-Based and "ENCORE"-Based Drilling Fluids

Drilling fluids based on standard "ENCORE" and "ACCOLADE" base oils as the oleaginous phase were formulated as exemplified in Table 10.

As noted above, the "ENCORE" drilling fluid base oil is a mixture of internal olefins. In contrast the "ACCOLADE" drilling fluid base oil is an ester and isomerized olefin blend that has a higher density and greater kinematic viscosity than does "ENCORE." As shown in the Summary Data for Table 10, drilling fluid formulations 1 and 6 not containing colloidal particles had relatively poor rheology profiles even before static aging at 200° F. "ENCORE"-based drilling fluid formulation 34 had a good rheology profile as initially formulated. The rheology profile increased after 16 hours of static aging. "ACCOLADE"-based drilling fluid formulation 35 had a comparable initial rheology profile to that of static-aged "ENCORE"-based drilling fluid formulation 34 after 16 hours of static aging. An even higher rheology profile was observed after 16 hours of static aging. It should be noted that static aged samples 34A and 35A both contained 20 lbs/bbl

TABLE 10

| | FLUID FORMULATIONS | | | | | |
|---|---|---|---|---|---|---|
| | 1 | 6 | 34 | 34A | 35 | 35A |
| ACCOLADE BASE OIL, BBL | 0.4809 | 0.5116 | — | — | 0.5088 | 0.5088 |
| ENCORE BASE OIL, BBL | — | — | 0.5083 | 0.5083 | — | — |
| OWR | 70/30 | 75/25 | 75/25 | 75/25 | 75/25 | 75/25 |
| LE SUPERMUL, LB | 11 | 11 | 15 | 15 | 15 | 15 |
| LIME, LB | 2 | 2 | 2 | 2 | 2 | 2 |
| WATER, BBL | 0.1261 | 0.1039 | 0.1057 | 0.1057 | 0.1058 | 0.1058 |
| $CaCl_2$ BRINE, BBL | 0.1138 | 0.0937 | 0.0953 | 0.0953 | 0.0954 | 0.0954 |
| ADAPTA, LB | 2 | 2 | 2 | 2 | 2 | 2 |
| API BARITE, LB | 317.0 | 314.0 | 340.5 | 340.5 | 337.5 | 337.5 |
| BARACARB 5, LB | 10 | 10 | — | — | — | — |
| BARACARB 50, LB | 10 | 10 | — | — | — | — |
| AQUAGEL GOLD SEAL, LB | — | 12 | — | — | — | — |
| TAU-MOD, LB | — | — | 4 | 4 | 4 | 4 |
| OCMA CLAY, LB | — | — | — | 20 | — | 20 |
| RHEMOD L, LB | 1 | 1 | 1 | 1 | 1 | 1 |
| STATIC AGE, HR AT 200° F. | 0 | 0 | 0 | 16 | 0 | 16 |
| SHEARED, MIN | 15 | 15 | 15 | 15 | 15 | 15 |
| DIAL READING AT 150° F. | | | | | | |
| 600 RPM | 79 | 78.5 | 68 | 78.5 | 79 | 90 |
| 300 RPM | 52 | 49.5 | 40 | 48 | 49 | 58 |
| 200 RPM | 45 | 43 | 33.5 | 41 | 40 | 48 |
| 180 RPM | 44 | 41 | 31 | 38.5 | 40 | 47.5 |
| 100 RPM | 34 | 31 | 22.5 | 28 | 28 | 34 |
| 90 RPM | 32 | 29.5 | 21 | 27 | 27.5 | 33 |
| 60 RPM | 27 | 24.5 | 17.5 | 23 | 23 | 228 |
| 30 RPM | 21 | 19 | 13.5 | 17.5 | 19 | 21 |
| 6 RPM | 12 | 12 | 9 | 11 | 11 | 13 |
| 3 RPM | 9 | 10.5 | 8.5 | 10 | 10 | 12 |
| 1.8 RPM | 8 | 9 | 6.5 | 9 | 9 | 11 |
| 0.9 RPM | 6 | 7.5 | 6 | 8.5 | 8.5 | 10.5 |
| SUMMARY DATA | | | | | | |
| PLASTIC VISCOSITY, CP | 27 | 29 | 28 | 30.5 | 30 | 32 |
| YIELD POINT, LB/100 $FT^2$ | 25 | 20.5 | 12 | 17.5 | 19 | 26 |
| 10 SEC GEL, LB/100 $FT^2$ | 10 | 10 | 10 | 10.5 | 11.5 | 12.5 |
| 10 MIN GEL, LB/100 $FT^2$ | 14 | 18 | 26 | 24 | 27 | 25.5 |
| 30 MIN GEL, LB/100 $FT^2$ | 10 | 20 | 32 | 27 | 32.5 | 27 |
| ELECTRICAL STABILITY, V | 448 | 555 | 950 | 1410 | 1060 | 1290 |

OMCA clay to simulate the accumulation of drill cutting solids during a drilling operation.

Figure 8:
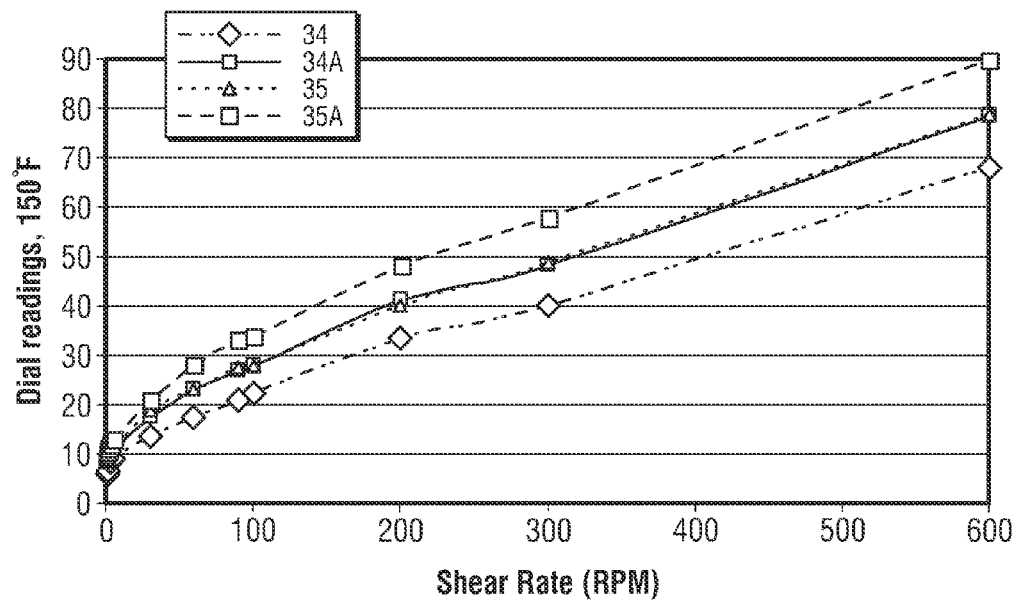
FIG. 8 shows an illustrative rheology plot comparing the performance of a representative drilling fluid formulated from an "ENCORE" base oil versus that formulated from an "ACCOLADE" base oil.

FIG. 8 shows an illustrative rheology plot comparing the performance of a representative drilling fluid formulated from an "ENCORE" base oil versus that formulated from an "ACCOLADE" base oil. The results of this Example indicate that ENCORE"-based fluids are capable of offering lower ECDs even after incorporating drill cutting solids from a drilling operation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. An organophilic clay-free drilling fluid comprising:
   an oleaginous fluid continuous phase;
   an aqueous fluid internal phase;
   a surfactant;
   a weighting agent; and
   a plurality of colloidal particles, the colloidal particles comprising fibrous colloidal particles and at least one other type of colloidal particle;
     wherein the fibrous colloidal particles comprise a clay mineral selected from the group consisting of ground sepiolite particles, attapulgite particles, and any combination thereof; and
     wherein at least a portion of the plurality of colloidal particles interact with the surfactant to form an associative supporting structure that inhibits sag of the weighting agent.

2. The organophilic clay-free drilling fluid of claim 1, wherein at least a portion of the plurality of colloidal particles comprises calcium carbonate.

3. The organophilic clay-free drilling fluid of claim 1, wherein the weighting agent comprises barite particles.

4. The organophilic clay-free drilling fluid of claim 3, wherein the barite particles are less than about 45 microns in size.

5. The organophilic clay-free drilling fluid of claim 1, wherein the weighting agent comprises at least one weighting agent selected from the group consisting of hematite, magnetite, iron oxides, illmenite, siderite, celestite, dolomite, olivine, calcite, magnesium oxides, magnesium tetraoxide, halites, calcium carbonate, and strontium sulfate.

6. The organophilic clay-free drilling fluid of claim 1, wherein the drilling fluid has a density that changes by less than about 5% over at least about 62 hours of static aging.

7. An organophilic clay-free drilling fluid comprising:
   an oleaginous fluid continuous phase;
   an aqueous fluid internal phase;
   a surfactant;
   barite particles; and
   a plurality of colloidal particles, the colloidal particles comprising fibrous colloidal particles and at least one other type of colloidal particle;
     wherein the fibrous colloidal particles comprise a clay mineral selected from the group consisting of ground sepiolite particles, attapulgite particles, and any combination thereof; and
     wherein the drilling fluid has a density that changes by less than about 5% over at least about 62 hours of static aging.

8. The organophilic clay-free drilling fluid of claim 7, wherein the drilling fluid has a sag rate of at most about 5 mm/hr.

9. The organophilic clay-free drilling fluid of claim 7, wherein at least a portion of the plurality of colloidal particles comprises calcium carbonate.

10. The organophilic clay-free drilling fluid of claim 7, wherein the barite particles are less than about 45 microns in size.

11. An organophilic clay-free drilling fluid comprising:
    an oleaginous fluid continuous phase;
    an aqueous fluid internal phase;
    a surfactant;
    barite particles having a size of at most about 45 microns; and
    a plurality of colloidal particles, the colloidal particles comprising fibrous colloidal particles and at least one other type of colloidal particle;
      wherein the fibrous colloidal particles comprise a clay mineral selected from the group consisting of ground sepiolite particles, attapulgite particles, and any combination thereof; and
      wherein at least a portion of the plurality of colloidal particles interact with the surfactant to form an associative supporting structure that inhibits sag of the barite particles.

12. The organophilic clay-free drilling fluid of claim 11, wherein the drilling fluid has a density that changes by less than about 5% over at least about 62 hours of static aging.

13. The organophilic clay-free drilling fluid of claim 11, wherein at least a portion of the plurality of colloidal particles comprises calcium carbonate.

* * * * *